March 11, 1941.  E. B. TOLMAN, JR  2,234,785
EXPANSION JOINT
Filed Dec. 1, 1939  2 Sheets-Sheet 1

Inventor:
Edgar B. Tolman Jr.
By Chritton, Wiles, Davis, Hirsch & Dawson.
Attys.

March 11, 1941.   E. B. TOLMAN, JR   2,234,785
EXPANSION JOINT
Filed Dec. 1, 1939   2 Sheets-Sheet 2

Inventor:
Edgar B. Tolman Jr.
By Chritton, Wiles, Davis, Hirsch & Dawson.
Attys.

Patented Mar. 11, 1941

2,234,785

UNITED STATES PATENT OFFICE 2,234,785

EXPANSION JOINT

Edgar B. Tolman, Jr., Chicago, Ill.

Application December 1, 1939, Serial No. 307,180

2 Claims. (Cl. 285—90)

My invention relates generally to expansion joints at which pipes are connected together in end to end relation, to permit of the expansion and contraction of the pipes lengthwise without placing undue strain on the pipes.

More especially the invention relates to expansion joints for pipes of pneumatic conveyors especially those for handling hot abrasive material, wherein the conduit through which the material is pneumatically conveyed, and formed of separate pipes connected together in end to end relation, is held rigid at its opposite ends, necessitating the provision of expansion joints between the pipes to compensate for expansion and contraction in the conveying of materials at different temperatures.

My primary object is to provide a novel, simple, and economical construction of expansion joint which will have long life and be highly effective to maintain the joints leakproof under continued use, even in the case of the handling of hot abrasive material.

Another object is to provide an expansion joint the parts of which need not be machined, which is of especial value in the case of a structure in which hot abrasive materials are conveyed and requiring for permanency that the parts of the joint exposed to the action of the material be of such hard metal that it cannot be machined at all, or if machinable, only with great difficulty.

Referring to the accompanying drawings.

Figure 1:
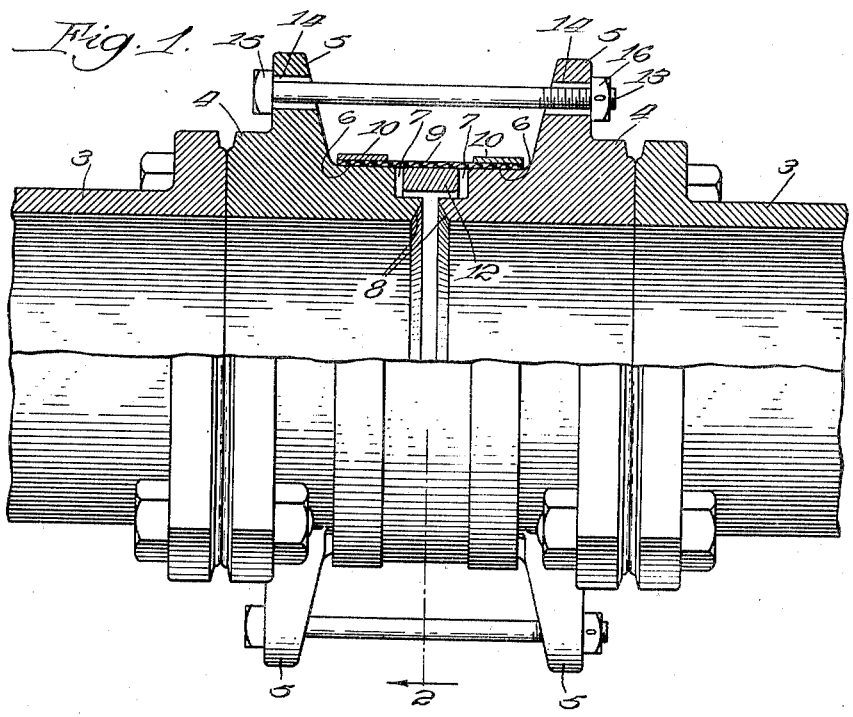
Figure 1 is a view in elevation, partly sectional, of the joint between pipes coupled together, the joint connection between these pipes being constructed in accordance with my invention.
Figure 2:
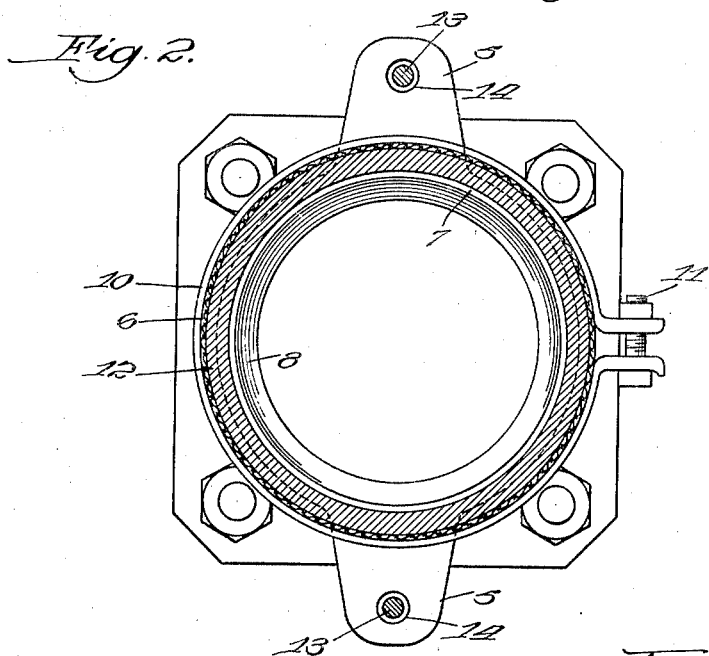
Figure 2 is a sectional view taken at the line 2 on Fig. 1 and viewed in the direction of the arrow.

In accordance with the embodiment of my invention illustrated in Figs. 1 and 2, the ends of the pipes to be coupled together and which may form part of the conduit through which material is pneumatically conveyed, these pipes being shown at 3, are equipped with annular flange sections 4 each shown as having a pair of diametrically opposed radial lugs 5, an annular seating surface 6 beyond the lugs 5, and an annular recessed portion 7 at its extremity; the terminal end face of each flange section 4 being annularly beveled as indicateed to present an annular inwardly receding surface 8, the surfaces 8 of the two opposing sections 4 thus converging radially outwardly.

The sections 4 in the completed conveyor structure preferably would be spaced apart when subjected to normal temperature conditions, as shown.

Surrounding the adjacent end portions of the flange sections 4 is a sleeve 9 of flexible material, such as for example asbestos cloth, preferably provided of seamless form, the sleeve seating at its ends on the seating portions 6 which it encircles and to which portions it is preferably cemented by any suitable material; the sleeve 9 spanning the recessed portions 7 of the flange sections 4. Split clamping bands 10, with their ends engaging drawup bolts 11, and clamping the ends of the sleeve 9 to the seats 6, are preferably provided.

Secured to the inner surface of the sleeve 9 between the seats 6 and spanning the space between the adjacent ends of the flange sections 4, is a flat ring 12, preferably of metal, which extends into the recesses 7 in spaced relation to the walls of the recesses and thus laps circumferentially disposed portions of each flange section.

The ring 12 not only serves to reinforce the sleeve 9 but also, in conjunction with the recessed portions of the flange sections permitting relative movement of the pipes in a direction crosswise of the pipes but to such a limited degree as not to unduly stress the sleeve 9, the flange sections thus being maintained in approximate alinement at all times.

Furthermore, the ring 12, in conjunction with the end portions of the flange sections 4 contoured as shown and described, serves to minimize access to the sleeve 9 of the material being conveyed, thereby prolonging the life of the sleeve.

The structure also comprises means for checking undue spreading apart of the flange sections 4 and relieving the sleeve 9 of any tensional strain under severe lengthwise contraction of the pipes; the means shown for this purpose comprising tie rods 13, in the form of bolts, extending through enlarged openings 14 in the lugs 5, with their heads 15 and nuts 16 at the outer sides of the lugs; the tie rods also serving to connect the flange sections 4 together, while permitting of relative movement of the flange sections toward and away from each other in the lengthwise expansion and contraction of the pipes.

As will be understood from the foregoing, the expansion joint as provided permits of lengthwise expansion of the pipes from the checked position shown, the sleeve 9 distorting as the ends of the flange sections 4 move toward each other, while preserving the desired tight joint between the flange sections 4, and straightening out as the pipes lengthwise contract.

Figure 3:
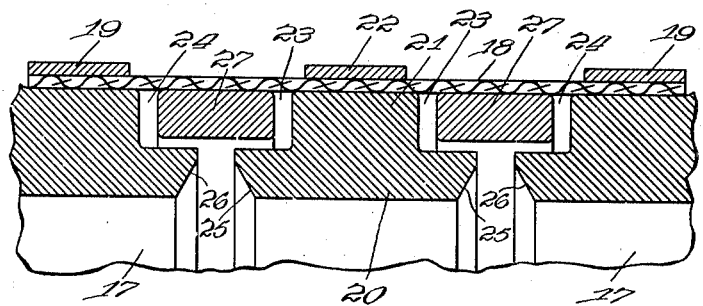
Figures 3, 4 and 5, fragmentary sectional views illustrating certain other forms of structure in which the invention may be embodied.

The construction shown in Fig. 3 is in the nature of a duplex expansion joint involving flange sections represented at 17 and corresponding with the flange sections 4, and a flexible sleeve represented at 18 and corresponding with the sleeve 9, the ends of the sleeve 18 being connected with the flange sections as in the case of the constructions shown in Figs. 1 and 2; end clamping bands 19, corresponding with the clamping bands 10, securing the sleeve in place.

This structure also comprises a short tubular joint section 20 interposed between the flange sections 17 and in spaced relation thereto and forming a continuation of the conduit, the joint section 20 being shown as secured at an annular flange 21 thereon, to the sleeve 18 as by means of a clamping band 22, like the bands 19.

The opposite ends of the joint section 21 and the adjacent ends of the flange sections 17 are annularly recessed as represented at 23 and 24, respectively, and annularly beveled as represented at 25 and 26, respectively.

Rings 27, like the ring 12, extend into the adjacent recesses 23 and 24 in spaced relation to the walls of these recesses, these rings being shown as secured to the sleeve 18.

Figure 4:
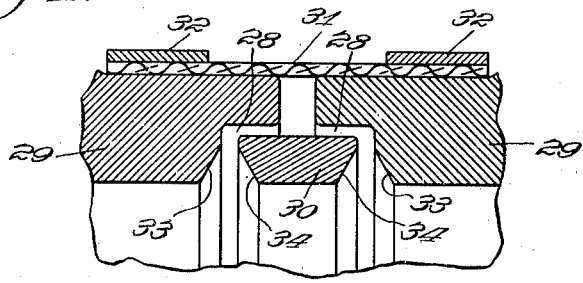

The construction shown in Fig. 4 is the same as that shown in Figs. 1 and 2 except that the recesses herein shown at 28, in the end walls of the flange sections shown at 29 and corresponding with the flange sections 4, instead of being in the outer peripheral portions of the flange sections are in the inner peripheral portions thereof as illustrated, and the ring, herein shown at 30, and located in the recesses 28 and in spaced relation to their walls, has no connection with the flexible sleeve shown at 31 and corresponding with the sleeve 9 and held in place on the flange sections 29 by clamping bands 32. In this construction the end faces of the flange sections at their inner peripheries are beveled as indicated at 33 and the opposing edges of the ring 30 beveled as indicated at 34.

Figure 5:
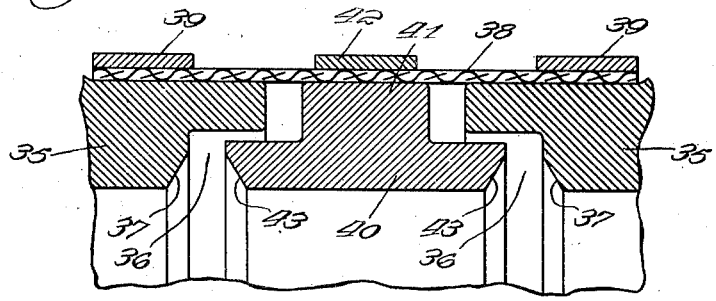

The construction shown in Fig. 5 which involves flange sections 35 like the flange sections 29 and similarly recessed and beveled as indicated at 36 and 37, with a flexible sleeve 38, corresponding with the sleeve 31 and similarly secured in place on the flange sections 35 by clamping bands 39, differs from the construction shown in Fig. 4 in that the ring, herein shown at 40, is wider than the ring 30 and has a peripheral flange 41 at which it is connected with the sleeve 38 as by means of a clamping band 42, the ends of the ring 40 being beveled as in the case of the ring 30, as indicated at 43.

As will be understood, each of the constructions shown in Figs. 3, 4 and 5 would be associated with contraction-limiting means as above explained and shown in Figs. 1 and 2 and involving the tie rods 13.

Furthermore, if desired, the duplex expansion joint, such as that shown in Fig. 3, instead of involving the recessing of the ends of the flange sections and the interposed tubular joint section and the location of the rings between the sleeve and inner peripheral portions of the flange sections and tubular joint section, as shown in Fig. 3, may be modified to provide the recesses in the inner peripheral portions of these members, instead of the outer peripheral portions, in accordance with the showing in Figs. 4 and 5, and the rings, provided as in either Figs. 4 or 5 and similarly disposed with relation to the walls of the recesses into which they extend.

As will be noted, the rings of Figs. 3 and 5 perform the above described functions of the rings 12 of Figs. 1 and 2, and the ring 30 of Fig. 4 these same functions except for reinforcing the sleeve.

A further advantage is presented by my invention inasmuch as, while the expansion joint functions to prevent infiltration of air and permit slight relative movement of the adjacent parts of the joint in a direction crosswise of the pipes, the parts of the joint exposed to the abrasive action of the material being conveyed do not require any machine work thereby permitting them to be made of hard metal castings, while permitting the joint to properly function.

The terminal end faces of the members at the joints are preferably beveled as stated inasmuch as by so shaping them the tendency of lumps of the material being conveyed, becoming permanently lodged between these members is reduced to the minimum.

While I have illustrated and described certain particular constructions embodying my invention, I do not wish to be understood as intending to limit my invention thereto as the structures shown may be variously modified and altered and the invention embodied in structures of other forms, without departing from the spirit of my invention.

What I claim as new and desire to secure by Letters Patent is:

1. In combination with tubular members to be connected together in end to end relation and subjected to lengthwise expansion and contraction, adjacent ends of said members having recesses, an expansion joint for connecting said members together consisting of a flexible sleeve secured at its ends to the opposing end portions of said members and spanning the space between members and surrounding said recesses, a tubular member between, and spaced from, said ends of said members and located in said sleeve, the ends of said last-named tubular member being recessed and rings extending into the recesses in said first-named tubular member and the recesses in said last-named tubular member.

2. In combination with tubular members to be connected together in end to end relation and subjected to lengthwise expansion and contraction, adjacent ends of said members having recesses, an expansion joint for connecting said members together consisting of a flexible sleeve secured at its ends to the opposing end portions of said members and spanning the space between said members and surrounding said recesses, a tubular member between, and spaced from, said ends of said members and located in said sleeve, the ends of said last-named tubular member being recessed and rings extending into the recesses in said first-named tubular member and the recesses in said last-named tubular member and secured to said sleeve.

EDGAR B. TOLMAN, Jr.